F. WALLACE & F. ERNST.
SAFETY FEED WATER CONTROLLER FOR BOILERS.
APPLICATION FILED NOV. 8, 1912.

1,074,536.

Patented Sept. 30, 1913.

2 SHEETS—SHEET 1.

Witnesses:
Christ Feinle, Jr.
C. C. Hines

Inventors,
Fred Wallace
and Fred Ernst.

By Victor J. Evans,
Attorney.

F. WALLACE & F. ERNST.
SAFETY FEED WATER CONTROLLER FOR BOILERS.
APPLICATION FILED NOV. 8, 1912.
1,074,536.
Patented Sept. 30, 1913.
2 SHEETS—SHEET 2.
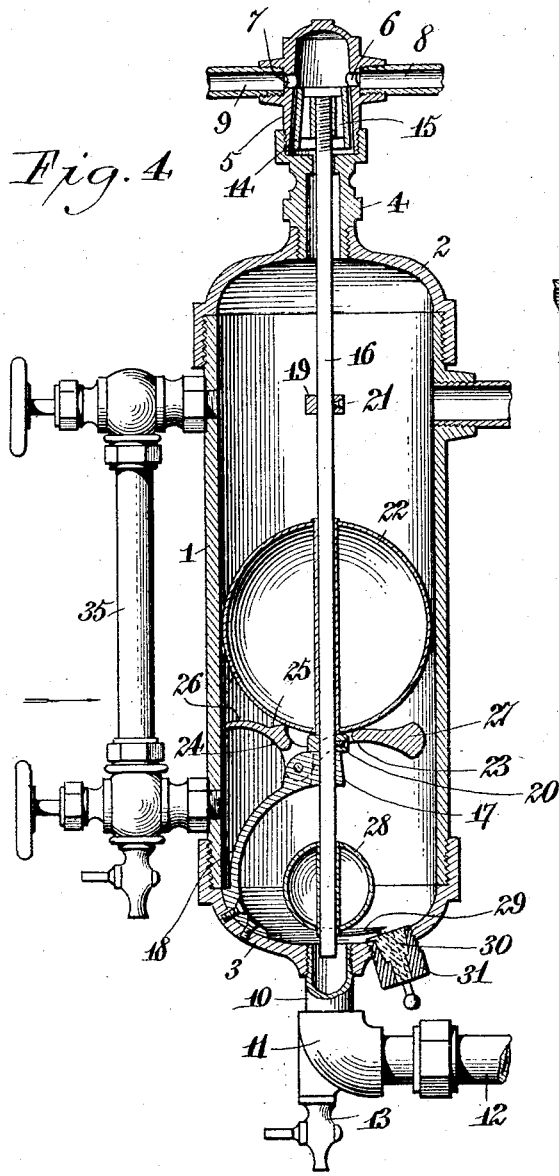
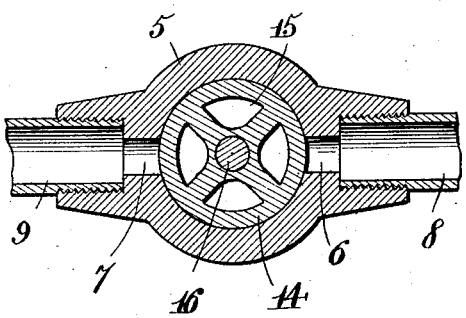
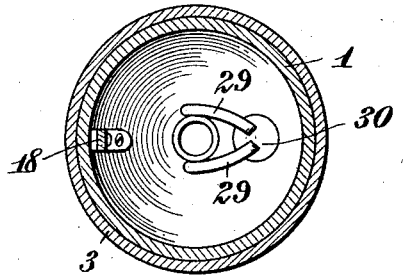
Witnesses:
Christ Feinle, Jr.,
C. C. Hines.
Inventors
Fred Wallace and
Fred Ernst.
By Victor J. Evans,
Attorney.
COLUMBIA PLANOGRAPH CO., WASHINGTON, D. C.

UNITED STATES PATENT OFFICE.

FRED WALLACE AND FRED ERNST, OF EDEN, NEW YORK.

SAFETY FEED-WATER CONTROLLER FOR BOILERS.

1,074,536.  Specification of Letters Patent.  Patented Sept. 30, 1913.

Application filed November 8, 1912. Serial No. 730,258.

*To all whom it may concern:*

Be it known that we, FRED WALLACE and FRED ERNST, citizens of the United States, residing at Eden, in the county of Erie and State of New York, have invented new and useful Improvements in Safety Feed-Water Controllers for Boilers, of which the following is a specification.

This invention relates to safety feed water controllers for boilers, the main object of the invention being to provide a device which will indicate the level of the water in the boiler at all times, and which is adapted to automatically cut off the flow of water to the boiler when the water in the boiler is at its normal high level.

A further object of the invention is to provide a controller which will automatically let on the flow of water to the boiler when the water in the latter flows to a predetermined extent below the normal level, and which in the event of the failure of the pump to work when the water level reaches a predetermined low point, will automatically sound an alarm to warn the engineer of the condition of affairs.

The invention consists of the features of construction, combination and arrangement of parts hereinafter fully described and claimed, reference being had to the accompanying drawings, in which:—

Figure 1:
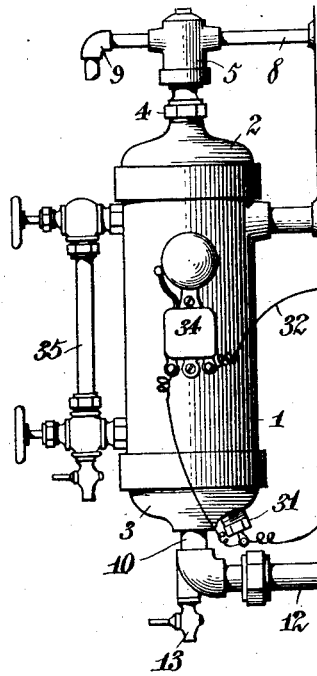
Figure 2:
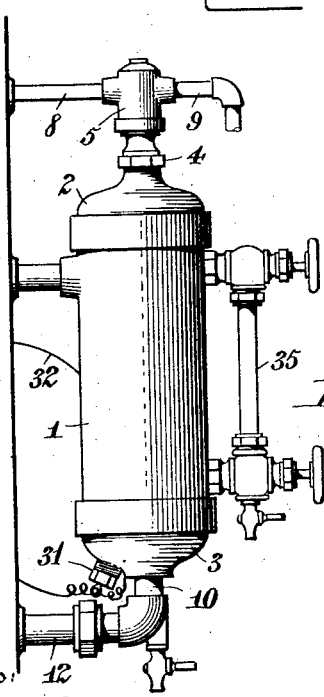
Figure 3:
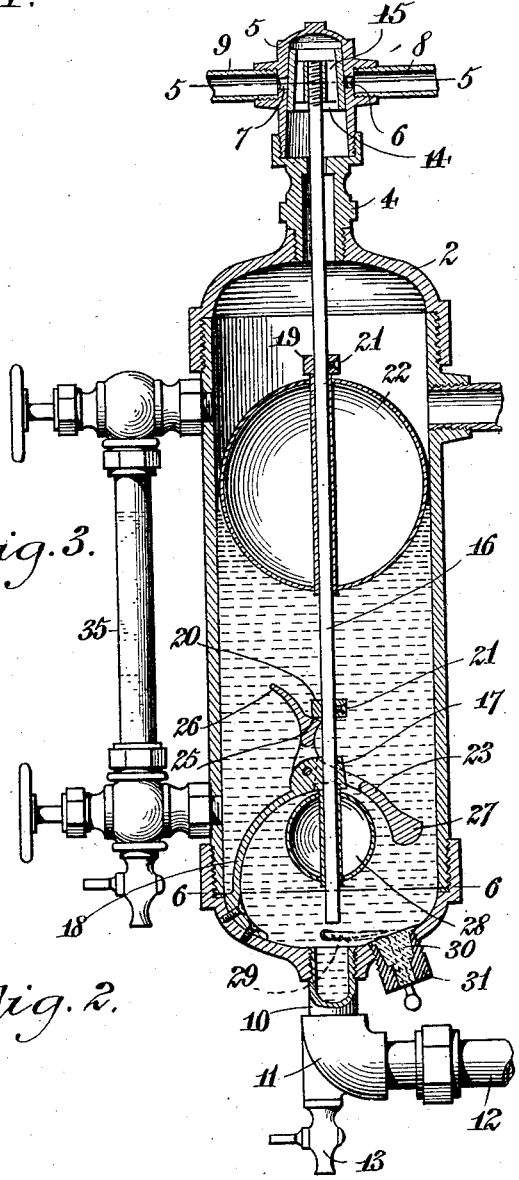

Figures 1 and 2 are opposite side elevations of a safety feed water controller constructed in accordance with our invention. Fig. 3 is a vertical longitudinal section through the controller, showing the parts in normal position, as when the water in the boiler is at normal high level. Fig. 4 is a similar view showing the position of the parts when the water in the boiler falls below the normal minimum level. Figs. 5 and 6 are horizontal sections on the lines 5—5 and 6—6 of Fig. 3.

In carrying our invention into practice, we provide a controller arranged in the line of flow of the feed water from its source of supply to the boiler, said controller embodying a cylindrical vertical casing 1 closed by top and bottom heads 2 and 3. Connected to the upper head 2 by a coupling 4 is a valve casing 5 having opposed ports 6 and 7 which are in communication respectively with water supply and delivery pipes 8 and 9, the latter being connected in practice with the usual automatic pump for delivering the water to the boiler.

The lower head 3 is connected by a short pipe section 10 and coupling 11 with a pipe 12 communicating with the boiler, whereby water is admitted to the casing 1, in which the level of the water at all times accords with the level of the water in the boiler. Connected with the coupling 11 is a drain valve 13 through which any sediment settling in the bottom of the casing may be drawn off, or through which the water in the casing may be discharged when it is desired to dismantle the controller for repairs or other purposes.

Disposed within the valve casing 5 is a vertically movable controlling valve 14, said valve being of the tapered plug type and provided with vertical passages 15 for the free flow of air therethrough in order to prevent it from becoming air bound. This valve is connected with the upper end of a valve rod or stem 16, which at its upper end is in guided connection with the coupling 4 and extends downwardly therefrom into the casing 1 and at its lower end passes through a guide sleeve 17 carried by a bracket 18 supported by the lower casing head 3. The valve 14 is movable upwardly to a position to close the passages 6 and 7 and cut off the flow of water to the boiler and is movable downwardly and automatically by gravity to uncover said ports and permit feed of water to the boiler under action of the pump.

Arranged in spaced relation upon the valve rod above the guide member 17 are contacts 19 and 20, each adjustably secured in position thereon by a clamping screw 21. Slidably mounted on the rod between said contacts is a main float or hollow spherical body 22, which is adapted to rest upon the surface of the body of water in the casing and to be controlled in position thereby.

The float 22 is mounted to slide upon the valve rod 16 between the contacts 19 and 20, and when the water in the casing 1 is at its maximum normal level, engages the contact 19 and holds the valve 14 closed against the feed of water to the boiler, as shown in Fig. 2. A bell crank latch 23 is pivoted to the bracket 18 and provided with a latch arm 24 having a supporting shoulder 25 and a trip projection 26 and a weighted arm 27, which latter normally holds the latch arm with the shoulder 25 in the path of downward movement of the contact 20, thus locking the valve in closed position.

The trip projection 26 is disposed in the path of downward movement of the main float 22 and is adapted to be depressed thereby to retract the latch in a manner hereinafter described.

Slidably mounted upon the lower end of the valve rod below the guide 17 is a smaller, secondary or signal controlling float 28, which is made of some metal which is a good conductor of electricity and which is adapted at the limit of its downward movement to engage and electrically connect a pair of spring contacts 29 embedded in nonconducting material 30 carried by a plug 31 supported by the cap 3, which contacts are connected with the opposite sides of an electric circuit 32 including a battery or other suitable source of electric energy 33 and containing a bell or other suitable signal 34, the bell and component parts of the signal circuit being supported upon or in suitable relation to the casing 1. Connected with the casing 1 is a water gage 35 of any suitable construction, whereby the level of the water in the casing may be at all times ascertained.

Assuming that the boiler is supplied with water up to its maximum level, it will be understood that the parts will be in the position shown in Fig. 2, in which the float 22 engages the contact 19 and holds the valve rod 16 elevated with the valve in closed position to cut off the flow of water to the boiler, and in which the float 28 is elevated out of engagement with the contact strips 29 and the latch member 23 engages the contact 20 and holds the valve and valve rod against dropping motion under the force of gravity. When the water in the boiler descends below the maximum normal level, the level of the water in the casing 1 is correspondingly lowered and the float 22 falls therewith without affecting the valve rod until it descends sufficiently to engage the trip projection 26, whereupon, if the water continues to lower, the latch will be retracted under the weight of said float, which will be moved to the position shown in Fig. 4, thus permitting the valve rod and valve to drop by gravity to valve opening position for the flow of water to the boiler, the downward movement of the valve and valve rod being limited by engagement of the lower contact 20 with the guide 17. This position of the parts is maintained until the water in the boiler and casing begins to rise again, and as the water rises in the casing it carries up with it the float 22 which releases the latch 23, allowing the same to return to normal position for the upward movement of the contact 20. As the float rises it finally engages the contact 19 and lifts the valve rod and valve, bringing the latter to cut-off position when the water again reaches its maximum level. If, however, from the failure of the pump or other cause, the boiler is not replenished with water after the float 22 has descended and the valve 14 has been moved to open position, the continued descent of the water finally affects the float 28, which, as the water approaches its minimum level, comes in contact with and engages the conductors 29, thus closing the alarm circuit 32 and sounding an alarm. This condition is reached at a time when the crown sheet of the boiler still remains covered with water to the depth of say three inches, allowing the engineer ample time to replenish the boiler with water or to take other measures to prevent an explosion. Under ordinary conditions the pump is automatically set into operation when the water in the boiler and casing reach the level indicated by the arrow shown in connection with the gage glass 35 in Fig. 2. It will be understood, of course, that when a resumption of flow again occurs, both floats return to normal position and the parts of the controller are again disposed for normal operation.

From the foregoing description, taken in connection with the drawings, the construction and mode of operation of our improved safety feed water controller will be readily understood, and it will be seen that it provides an apparatus which is simple, reliable and efficient in action, and which in the event of liability of danger will automatically sound a signal to warn the engineer. The advantages of the device will thus be readily understood and appreciated.

We claim:—

1. A feed water controller for steam boilers comprising a water containing casing in communication with the boiler, a valve for controlling the feed of water to the boiler, a rod connected with the valve and movable vertically in the casing, said rod being adapted to drop by gravity to valve opening position, spaced contacts upon the rod, a main float slidable on the rod between said contacts and coöperating with the upper contact to lift the rod to valve closing position, locking means adapted to engage the lower contact to hold the valve rod in valve closing position and to be retracted to release the rod by the main float when the latter descends to a predetermined position, a second float mounted on the rod below the level of the main float, an electric circuit containing an alarm, and contacts included in said circuit and adapted to be connected by said second float to close the circuit when said second float descends to a predetermined degree.

2. A feed water controller for steam boilers, comprising a vertical water containing casing in communication at its lower end with the boiler, a vertically movable valve at the upper end of said casing controlling the flow of water to the boiler, a rod carrying said valve and depending into the casing, said rod being adapted to drop by gravity to valve-opening position, a pair of spaced contacts on the rod, a main float slidable on the rod between said contacts, a bracket supported by the casing, a second float slidably mounted on the rod below the level of the main float and limited in upward motion by said bracket, an electric circuit containing an alarm, contacts included in said circuit and adapted to be connected by said second float to close the circuit when said second float descends to a predetermined degree, and a pivoted latch mounted upon the bracket, said latch having a weighted arm for maintaining it in locking position, a latch arm adapted for engagement with the lower contact to hold the valve rod in valve closing position, and a trip projection adapted to be engaged by the main float on its descent to retract the latch and permit the valve rod to drop to valve opening position.

In testimony whereof we affix our signatures in presence of two witnesses.

FRED WALLACE.
FRED ERNST.

Witnesses:
MILO F. COLVIN,
BEULAH M. POUND.

Copies of this patent may be obtained for five cents each, by addressing the "Commissioner of Patents, Washington, D. C."